United States Patent
Rinker et al.

(10) Patent No.: US 10,322,463 B2
(45) Date of Patent: Jun. 18, 2019

(54) RECONFIGURABLE FIXTURING FOR WELDING

(71) Applicant: GM GLOBAL TECHNOLOGY OPERATIONS LLC, Detroit, MI (US)

(72) Inventors: Teresa J. Rinker, Royal Oak, MI (US); Leonid C. Lev, Cupertino, CA (US)

(73) Assignee: GM Global Technology Operations LLC., Detroit, MI (US)

( * ) Notice: Subject to any disclaimer, the term of this patent is extended or adjusted under 35 U.S.C. 154(b) by 464 days.

(21) Appl. No.: 15/147,287

(22) Filed: May 5, 2016

(65) Prior Publication Data
US 2017/0320156 A1    Nov. 9, 2017

(51) Int. Cl.
| | |
|---|---|
| *B23K 9/08* | (2006.01) |
| *B23K 9/007* | (2006.01) |
| *B23K 37/04* | (2006.01) |

(52) U.S. Cl.
CPC .............. *B23K 9/08* (2013.01); *B23K 9/007* (2013.01); *B23K 37/0426* (2013.01)

(58) Field of Classification Search
CPC ...... B23K 9/08; B23K 37/0426; B23K 9/007; B21D 26/04; B23Q 3/1543; B25B 11/00
(Continued)

(56) References Cited

U.S. PATENT DOCUMENTS 2,910,663 A * 10/1959 Wilk ..................... H01F 27/263
336/210
3,071,853 A * 1/1963 Price ..................... B21D 47/00
228/181

(Continued)

FOREIGN PATENT DOCUMENTS

| | | |
|---|---|---|
| CA | 2961442 A1 | 4/2016 |
| CN | 1137964 A | 12/1996 |

(Continued)

OTHER PUBLICATIONS

Todd Whitworth, "Fixturing for Automated Welding in Automotive—Repeatability, Access and Protection are Key", Metal Forming Magazine, Feb. 2014, 4 pages, http://www.metalformingmagazine.com/magazine/article.asp?aid=9018, PMA Services, Inc., Independence, Ohio.

(Continued)

*Primary Examiner* — Ibrahime A Abraham
*Assistant Examiner* — Frederick F Calvetti
(74) *Attorney, Agent, or Firm* — Quinn IP Law (57) ABSTRACT

A system for joining at least two components by welding includes a magnetic base for receiving the components for welding and a flexible magnetic member configurable to correspond to a weld path defining a weld joining the components. The flexible magnetic member exerts a retention force on the components in response to a magnetic field produced by selective activation of the magnetic base. The system can include a magnetic locating element positioned adjacent a perimeter edge of the component to be welded, for generating a repulsive magnetic force between the flexible magnetic member and the magnetic locating element to locate the flexible magnetic member relative to the perimeter edge and provide clearance for a welding device to access a continuous weld path defined by the perimeter edge, such that the welding device can form a continuous weld along the weld path. A welding method using the system is provided.

20 Claims, 3 Drawing Sheets

(58) Field of Classification Search
USPC .............................................. 219/123; 269/8
See application file for complete search history.

(56) References Cited

U.S. PATENT DOCUMENTS

| | | | | |
|---|---|---|---|---|
| 3,941,293 | A * | 3/1976 | Chartet ................ | B23K 1/0012 228/44.3 |
| 4,840,303 | A * | 6/1989 | Fujii ..................... | B23K 26/26 219/121.63 |
| 4,854,493 | A * | 8/1989 | Fujii ..................... | B23K 26/26 228/5.7 |
| 5,023,427 | A * | 6/1991 | Neiheisel ............... | B23K 26/26 219/121.31 |
| 5,199,631 | A * | 4/1993 | Anderson ............. | B23K 20/023 228/181 |
| 5,229,571 | A * | 7/1993 | Neiheisel ............... | B23K 26/10 219/121.63 |
| 5,878,944 | A * | 3/1999 | Aebersold ............. | B23K 26/02 219/161 |
| 5,904,992 | A * | 5/1999 | Yasui ................... | B23K 20/023 428/593 |
| 6,053,392 | A | 4/2000 | Aebersold et al. | |
| 6,479,786 | B1 * | 11/2002 | Fields, Jr. ............. | B23K 26/032 219/121.63 |
| 7,176,436 | B2 | 2/2007 | Zheng et al. | |
| 2006/0021676 | A1 * | 2/2006 | McDaniel ................ | B27C 5/10 144/144.1 |
| 2009/0159579 | A1 * | 6/2009 | Nishio ................... | B23K 26/03 219/121.63 |
| 2016/0001427 | A1 * | 1/2016 | Evans ................... | B23K 37/047 219/121.14 |
| 2016/0072426 | A1 * | 3/2016 | Babineau, Jr. .......... | H02S 20/23 52/173.3 |
| 2017/0197268 | A1 * | 7/2017 | Retter ..................... | B25B 5/10 |
| 2018/0140078 | A1 * | 5/2018 | Williamson ............. | A45F 5/02 |

FOREIGN PATENT DOCUMENTS

| | | |
|---|---|---|
| CN | 204277324 U | 4/2015 |
| DE | 69130077 T2 | 1/1999 |
| JP | 2003071590 A | 3/2003 |

OTHER PUBLICATIONS

B. Li, B. W. Shiu, and K. J. Lau, "Fixture Configuration Design for Sheet Metal Assembly with Laser Welding: A Case Study", 2002, pp. 501-509, The International Journal of Advanced Manufacturing Technology, © Springer-Verlag London Ltd., London, England.

Flemming O. Olsen, "Flexible Solution of the Fixturing Problem in Sheet Metal Laser Butt Welding", 2 pages, Proc. SPIE 2207, Laser Materials Processing: Industrial and Microelectronics Applications, 27, Sep. 7, 1994, doi:10.1117/12.184729; http://dx.doi.org/10.1117/12.184729, Vienna, Austria.

Flemming O. Olsen, "A Flexible Solution of the Fixturing Problem in Sheet Metal Laser Butt Welding", 7 pages, Jan. 1994, Laboratory of Process and Production Engineering, Institute of Manufacturing Technology, Technical University of Denmark, DK-2800, Lyngby, Denmark.

Holger Schlueter, "Laser Beam Welding: Benefits, Strategies, and Applications", pp. 37-39, Welding Journal, Trumpf, Inc., May 2007, Farmington, Connecticut.

* cited by examiner

RECONFIGURABLE FIXTURING FOR WELDING

TECHNICAL FIELD

The present disclosure relates generally to a welding fixture and a method of using a welding fixture to weld at least two components to form a welded assembly.

BACKGROUND

Laser welding and metal inert gas (MIG) welding is used in the manufacture of assemblies formed by welding thin metal sheets together. An example of this is the formation of cooling fins and radiators used in automotive and electronic applications, which are formed from thin metal sheets welded together along the perimeter of the sheets. Coolant passages defined by the metal sheets in the cooling fin and/or radiator may be formed and/or sealed by welding performed in the central portion of the fin and/or radiator. Weld quality is critical to the sealing of the cooling fin, radiator, and/or coolant passages formed therein.

Typically, the thin metal sheets are positioned together on a welding fixture, and retained to the welding fixture using mechanical clamps, during welding of the metal sheets to each other using a welding device such as a high energy laser, and electron beam/plasma, arc-welder, MIG welder, or other similar device. To weld the metal sheets to each other along their full perimeter, multiple steps are required, including welding along portions of the perimeter between and around the various clamps holding the metal sheets together, repositioning the clamps, and then welding in the remaining portions of the perimeter which were not accessible due to the initial positioning of the clamps. As such, multiple weld segments must be formed and connected with other weld segments to form a weld and/or seal about the entire perimeter of the metal sheets, and the welding device must be started and stopped for each weld segment and after repositioning of the clamps. The starting and stopping of the welding device and/or the overlapping of the weld segments can cause discontinuities in the weld which may affect weld quality and/or sealing integrity of the seal formed by the weld. Further, clamping, unclamping and re-clamping of the thin metal sheets during the welding process can cause distortion of the sheets, and shifts in positioning of the sheets relative to each other, resulting in warping due to thermal distortion and/or dimensional variability in the welded assembly.

SUMMARY

A system for joining at least two components by welding includes a magnetic base for receiving the components for welding and a flexible magnetic member configurable to correspond to a weld path defining a weld joining the components. The flexible magnetic member exerts a retention force on the components in response to a magnetic field produced by selective activation of the magnetic base. The system can include a magnetic locating element positioned adjacent a perimeter edge of the component to be welded, for generating a repulsive magnetic force between the flexible magnetic member and the magnetic locating element to locate the flexible magnetic member relative to the perimeter edge and provide clearance for a welding device to access a continuous weld path defined by the perimeter edge, such that the welding device can form a continuous weld along the weld path without having to interrupt formation of the weld to remove and relocate fixturing retaining the components in position relative to each other during the welding process. The retention force provided by the flexible magnetic member is uniform such that component distortion, waviness, etc. due to the retention force is negligible or eliminated and a gap between the components along the weld path to be welded is minimized or eliminated. Because the weld path and the clearance spacing along the weld path is uninterrupted by fixturing, a welding device can access the weld path and form a continuous and uniform weld along the weld path, enhancing the consistency and quality of the weld. Because the retention force exerted by the flexible member is distributed consistently and continuously along the weld path, during heating and cooling of the components during welding distortion is minimized. Welding cycle time and cost is decreased by forming a single continuous weld along the weld path, and by not having to remove and/or reposition fixturing to provide clearance for a welding device to access the entirety of the weld path. In an illustrative example, the welding system is used to form a continuous weld along the perimeter edge of a cooling fin comprising two or more cooling plates which are welded together according to a method provided herein to form the cooling fin. The cooling plates, in the illustrative example, can be made of aluminum sheet having a thickness at or about 0.2 mm or stainless steel sheet having a thickness at or about 0.1 mm.

A method for welding at least two components includes receiving at least two components onto a magnetic base, where the magnetic base is configured to produce a magnetic field when activated, and where the at least two components define a weld path for welding the at least two components to form a welded assembly. The method further includes positioning a flexible member including a magnetic component in contact with one of the at least two components such that the components to be welded are positioned intermediate the flexible member and the magnetic base, and the flexible member is positioned relative to the weld path such that a continuous clearance spacing is provided along the weld path. The method continues with activating the magnetic base to generate a magnetic retention force between the flexible member and the magnetic base to retain the at least two components to the magnetic base. In a non-limiting example, the method can further include positioning a locating element relative to the flexible member, where the locating element is configured to cooperate with the flexible member to generate a magnetic locating force between the flexible member and the locating element, and where the weld path and the continuous clearance spacing is intermediate the flexible member and the locating element. The method can include actuating a welding device and continuously moving the actuated welding device along the welding path to form a continuous weld along the welding path.

As used herein, the terms "a," "an," "the," "at least one," and "one or more" are interchangeable and indicate that at least one of an item is present. A plurality of such items may be present unless the context clearly indicates otherwise. All numerical values of parameters, quantities, or conditions in this disclosure, including the appended claims, are to be understood as being modified in all instances by the term "about" or "approximately" whether or not "about" or "approximately" actually appears before the numerical value. "About" and "approximately" indicate that the stated numerical value allows some slight imprecision (e.g., with some approach to exactness in the value; reasonably close to the value; nearly; essentially). If the imprecision provided by "about" or "approximately" is not otherwise understood with this meaning, then "about" and "approximately" as used herein indicate at least variations that may arise from methods of measuring and using such parameters. Further, the terminology "substantially" also refers to a slight imprecision of a condition (e.g., with some approach to exactness of the condition; approximately or reasonably close to the condition; nearly; essentially). In addition, disclosed numerical ranges include disclosure of all values and further divided ranges within the entire range. Each value within a range and the endpoints of a range are all disclosed as separate embodiments. The terms "comprising," "comprises," "includes," "including," "has," and "having" are inclusive and therefore specify the presence of stated items, but do not preclude the presence of other items. As used in this disclosure, the term "or" includes any and all combinations of one or more of the listed items.

The above features and advantages, and other features and advantages, of the present teachings are readily apparent from the following detailed description of some of the best modes and other embodiments for carrying out the present teachings, as defined in the appended claims, when taken in connection with the accompanying drawings.

DETAILED DESCRIPTION

Referring to the drawings wherein like reference numbers represent like components throughout the several figures, the elements shown in FIGS. 1-10 are not to scale or proportion. Accordingly, the particular dimensions and applications provided in the drawings presented herein are not to be considered limiting.

Referring to FIGS. 1-4, a system 100 and method is provided for joining at least two components 44, 46 by welding the components 44, 46 together, using a welding device 42 (FIG. 2), to form at least one weld 48, thereby forming a welded assembly 40. The system 100, which may also be referred to herein as a welding apparatus or as a welding fixture, includes a magnetic base 14 for receiving the components 44, 46 for welding, and at least one flexible magnetic member 10 for retaining the components 44, 46 to the magnetic base 14 and relative to a welding template 90 during welding by the welding device 42 to form the welded assembly 40. In the non-limiting example shown in FIGS. 1-4, and referring to FIGS. 2 and 4, the components 44, 46 are layered on the magnetic base 14 such that the component 44 is immediately adjacent to and in contact with the flexible magnetic member 10, and the component 46 is immediately adjacent to and in contact with one of the magnetic base 14 or a substrate 12 positioned on the magnetic base 14, where the welding template 90 is included in the one of the magnetic base 14 and the substrate 12 which is immediately adjacent the component 46. The welding template 90, which can be referred to herein as a template 90, can be at least partially defined by one or more weld paths 80 of one or more respective welds 48 joining the components 44, 46 to form the welded assembly 40. In the example shown in FIGS. 1-4, the template 90 is included in the substrate 12, which is positioned on the magnetic base 14 and configured to receive the components 44, 46 for welding. In an illustrative example, the template 90 can include a plurality of channels or a trough 32 formed in the substrate 12, where in the example shown, each of the troughs 32 corresponds to and/or is defined by a respective weld path 80 of a weld 48 joining the components 44, 46.

For simplicity of illustration, the figures show the welded assembly 40 including only two components 44, 46, however this example is illustrative and it would be understood that the assembly 40 can include one or more components in addition to and disposed intermediate the components 44, 46, such that forming the weld 48 to form the welded assembly 40 would include positioning the additional components (not shown) intermediate, e.g., layered in between, the components 44, 46 on the magnetic base 14, retaining the components 44, 46 and intermediate components to the magnetic base 14 and in position relative to the template 90 using at least one flexible magnetic member 10, and forming the weld 48 which penetrates through and joins the components 44, 46 and the intermediate components layered therebetween, to form the welded assembly 40. The components 44, 46 can be made of any type of material to be welded, magnetic or non-magnetic, including, for example, metal based materials and polymer based materials. By way of example, the components 44, 46 and intermediate components forming an assembly 40 can be made of one of aluminum based material, steel based material, stainless steel, titanium based material, and copper based material. By way of example, the components 44, 46 and intermediate components forming an assembly 40 can be made of polymer based material, or other non-metallic materials which can be joined by laser welding. In an illustrative example, the components 44, 46 are formed from aluminum sheet having a thickness in the range of 0.05 mm to 0.03 mm. In another illustrative example, the components 44, 46 are formed from stainless steel sheet having a thickness at or about 0.1 mm.

The flexible magnetic member 10 includes a magnetic component 28. The flexible magnetic member 10 may be referred to herein as a flexible member 10. The flexible member 10 can be flexibly reconfigured from one to another of a plurality of shapes, where at least one shape of the plurality of shapes is determined by and/or corresponds to at least one of the weld path 80 defined for the assembly 40 and the template 90. For example, referring to FIGS. 1 and 3, a flexible member indicated at 10A is configurable to a shape corresponding to a weld path 80A defining a weld 48 (FIG. 2) formed at an exterior perimeter edge 92 of the assembly 40 and to a trough 32A corresponding to the weld path 80A. The shape of the flexible member 10A "corresponds," as that term is used herein, to each of the weld path 80A and the trough 32A, for example, by having the same shape as each of the weld path 80A and the trough 32A, and/or, for example, by being immediately adjacent and conforming to the weld path 80A and the trough 32A. In another example shown in FIG. 10, a flexible member 10D is configurable into the generally "Z" shape, where the Z-shape is determined by the weld path 80D defined at a perimeter of a bridge portion 82 of an assembly 40, such that the flexible member 10D is configurable into a shape that is determined by and/or conforms to the bridge portion 82 and the weld path 80D, being contained within both of these features.

The magnetic base 14 can be selectively activated to produce a magnetic field of sufficient strength such that an attractive magnetic force 58 (FIG. 4) can be generated between the flexible member 10 and the magnetic base 14 to retain components 44, 46 between the flexible member 10 and the magnetic base 14 in a predetermined position relative to each other and to the weld template 90 defined by the assembly 40 including the components 44, 46. The attractive magnetic force 58 generated between the flexible member 10 and the magnetic base 14 may also be referred to herein as a magnetic retaining force and/or as a retaining force 58. The magnetic base 14 can be of any configuration suitable to be selectively activated to produce a magnetic field. By way of illustrative example, the magnetic base 14 can include one or more of an electromagnet (not shown), a permanent magnet (not shown), or a combination of these such that the magnetic base 14 can be configured and selectively actuated as an electromagnet base, a permanent magnetic base, and/or an electro-permanent magnetic base. The magnetic base 14 can also be referred to herein as a magnetic chuck and/or as an electromagnet.

Figure 1:
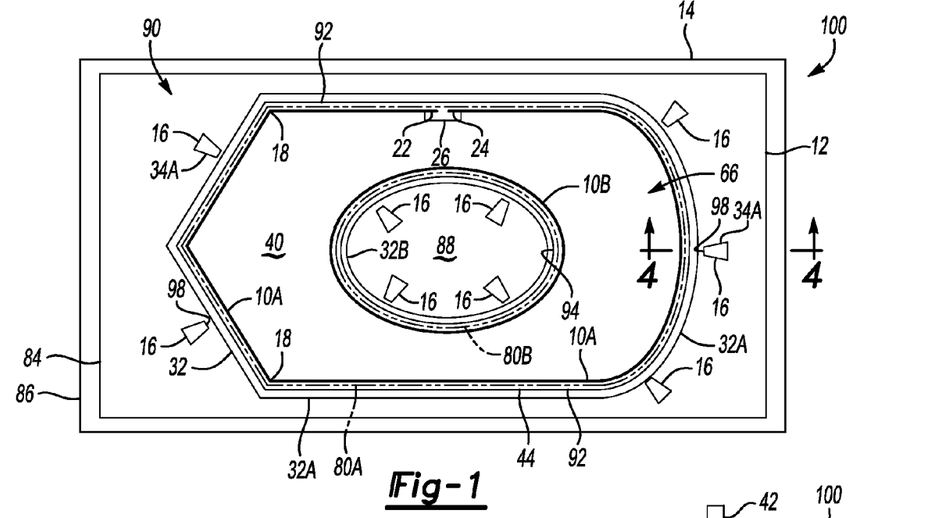
FIG. 1 is a schematic illustration of a top view of a welding fixture showing a flexible member retaining components to be welded to form an assembly to an electromagnet base.
Figure 2:
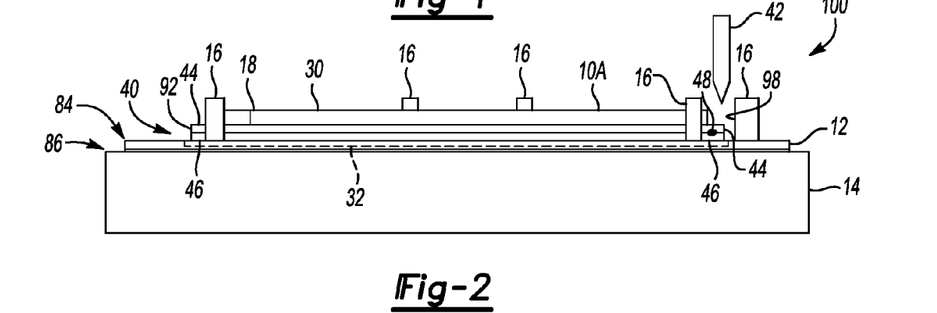
FIG. 2 is a schematic illustration of a side view of a welding system including the welding fixture of FIG. 1.
Figure 4:
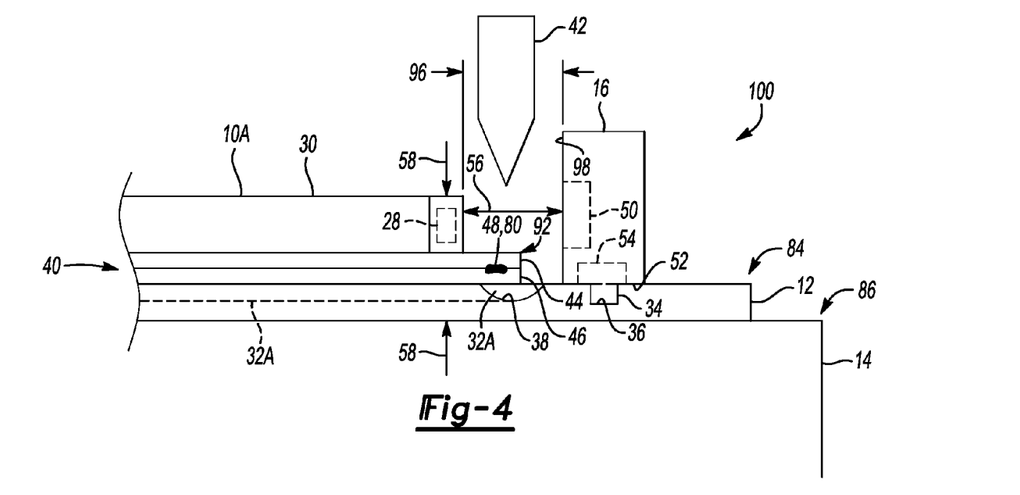
FIG. 4 is a schematic illustration of a cross-sectional fragmentary view of section 4-4 of FIG. 1.

As shown in FIGS. 1, 2 and 4, the components 44, 46 are retained to the magnetic base 14 solely by the magnetic retaining force 58 generated between the flexible member 10 and the magnetic base 14, such that mechanical clamping of the components 44, 46 to the magnetic base 14 or other means to supplement the retaining force 58 are not required. By using one or more flexible magnetic members 10 to retain the components 44, 46 relative to each other and in position relative to the template 90 during the welding process, and by positioning the flexible member 10 adjacent and/or conforming to the weld path 80, the retention force 58 is limited to a narrow band or area immediately adjacent the weld path 80 such that a uniform retention force 58 is exerted on the components 44, 46 to minimize and/or eliminate a gap 70 between the components 44,46, such that the components 44, 46 are substantially in contact with each other and a gap width 72 (FIG. 8) between the components 44, 46 is minimized, e.g., approaches zero and/or is eliminated to enhance consistency in formation of the weld 48, and such that waviness, flexing, or other distortion of the components 44, 46 during formation of the weld 48 is negligible and/or eliminated. Further, the continued uniform application of the retention force 58 subsequent to formation of the weld 48, e.g., through the cooling phase of solidifying the weld 48, minimizes and/or eliminates thermal distortion along the weld path 80 in the welded assembly 40. In an illustrative example, the components 44, 46 are made from sheet material having a thickness in the range of 0.05 mm to 0.3 mm, and the retaining force 58 generated by the flexible member 10 in cooperation with the magnetic base 14 is such that the components 44, 46 are retained in contact with each other such that the gap 70 therebetween is substantially eliminated or is a negligible air gap 70 having a gap width 72 approaching zero.

In one example, the magnetic base 14 can be selectively activated such that a localized magnetic field is generated only in selective portions, e.g., localized areas, of the magnetic base 14. In an illustrative example, the magnetic base 14 can be configured such that activating the magnetic base 14 generates a localized magnetic field along and/or immediately adjacent to the weld path 80, such that the attractive magnetic force 58 generated between the flexible member 10 and the magnetic base 14 is localized to the area immediately adjacent the weld path 80, and such that the flexible member 10 is preferentially positioned immediately adjacent the weld path 80 by the localized attractive magnetic force 58. By localizing the magnetic field generated by the magnetic base 14 to select areas of the template 90, the use of and/or need for locating elements 16, as described further herein, can be minimized and/or eliminated.

Figure 5:
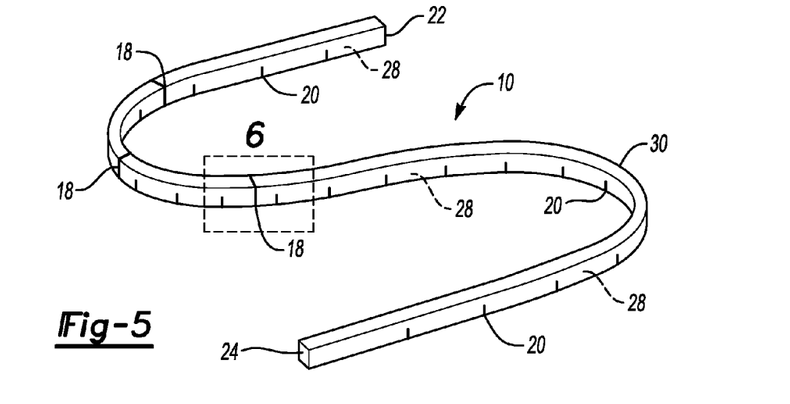
FIG. 5 is a schematic illustration of a perspective view of the flexible member of FIG. 1.
Figure 6:
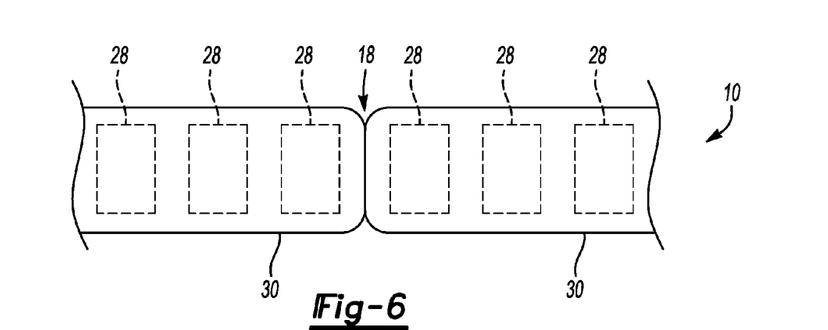
FIG. 6 is a schematic illustration of a side fragmentary view of section 6 of FIG. 5.
Figure 7:
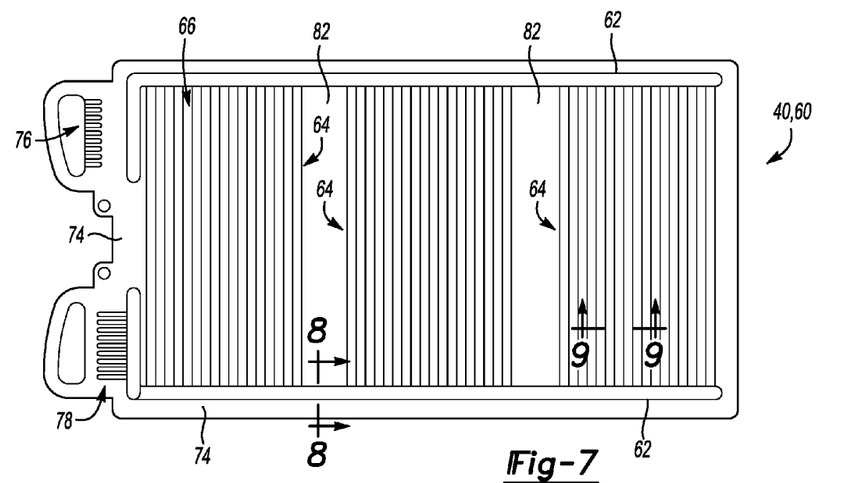
FIG. 7 is a schematic illustration of a top view of two or more cooling plates to be welded to form a cooling fin.
Figure 8:
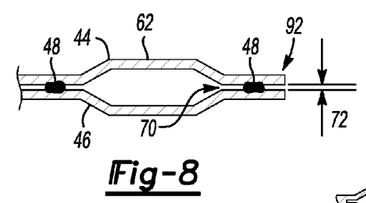
FIG. 8 is a schematic illustration of a cross-sectional fragmentary view of section 8-8 of FIG. 7.

In an illustrative example, the flexible member 10 can include a casing 30 for containing the magnetic component 28. The casing 30 can be magnetic or non-magnetic, and can be made of a metal-based material, a polymer-based material, a ceramic-based material and/or a rubber-based material. In the example shown in FIG. 5, the casing 30 is made from a flexible polymer-based or rubber material such that the casing 30 can be molded to contain a plurality of magnetic components 28 therein, can be reconfigured into a plurality of shapes including shapes defined by a weld path 80 or template 90, such that the casing 30 can be positioned on and moved relative to the component 44 without reacting to, scratching, marring or otherwise damaging the component 44, and such that weld splatter which may be produced during formation of the weld 48 is non-adherent to or easily removable from the casing 30. The casing 30 is formed from a material which is resistant to heat distortion or other deterioration due to heat generated during forming of the weld 48 adjacent the flexible member 10. The magnetic component 28 is made of at least one of a magnetic material and a ferromagnetic material. The magnetic component 28 can be configured as a single magnetic element, such as a magnetic cable (not shown) extending the length of the flexible member 10, or as a plurality of magnetic elements which may be discrete elements such as the magnetic components 28 shown in FIG. 6, or a magnetic filler material 28 dispersed in the flexible member 10, as shown in FIG. 5. In the example shown in FIG. 6, a plurality of discrete magnetic components 28 can be placed at intervals within the casing 30 such that flexible material forming the casing 30 is disposed between the magnetic components 28 to facilitate bending and reconfiguring of the flexible member 10 from one shape to another shape. In the example shown in FIG. 5, the magnetic filler material dispersed in the coating 30 and comprising the magnetic component 28 of the flexible member 10 can include one or more of particles, fibers, flakes, etc. made of a magnetic material, which, by way of non-limiting example, may be a ferromagnetic material.

The examples provided herein are illustrative and non-limiting, and other configurations of the flexible member 10 can be used which are reconfigurable and which can include a magnetic component 28 such that the flexible member 10 and the magnetic base 14 can cooperative when the magnetic base 14 is activated to generate an attractive magnetic force 58 therebetween, which can be used as a retaining force 58 to retain the components 44, 46 in position between the flexible member 10 and the magnetic base 14 relative to the template 90. For example, the flexible member 10 can be formed as a magnetic cable, as a plurality of jointed magnetic segments, as a magnetic strip, etc. The shape of the cross-section of the example shown in FIGS. 4-5 of the flexible member 10 is not intended to be limiting, and cross-sections formed in other shapes, such as other polygonal, oval, non-polygonal, regular and irregular shapes, may be used. In the example shown (FIG. 4), the flexible member may include a flat surface for interfacing with the surface of the component 44, such that the retention force 58 generated between the flexible member 10 and the magnetic base 14 can be distributed across the interface between the flat surface of the flexible member 10 and the component 44. In another example, the flexible member 10 may have a cross-section which is oval or tapered such that additional clearance can be provided at the component surface 44 between the weld path 80 and the interface between the interface surface of the flexible member 10 and the component 44.

Referring to FIGS. 1, 2 and 5, the flexible member 10 can include one or more joints 18 for reconfiguring the flexible member into a shape determined by and/or corresponding to a weld path 80. One or more of the joints 18 can be configured as living hinges (FIGS. 1, 5, 6) defined by and/or formed in the casing 30, the magnetic components 28, and/or the flexible member 10. In the example shown in FIG. 5, the flexible member 10 can include first and second ends 22, 24, which can be attached to each other and/or otherwise connected to form a continuous flexible member 10, as shown in FIG. 1 for flexible member 10A. A connector 26 can be provided for connecting the ends 22, 24, which can be a clip, fastener, sleeve, or other suitable connector. The flexible member 10 can include one or more position indicators 20 which can be used to position the flexible member 10 relative to the template 90 and/or the component 46. For example, the position indicator 20 can be a marking which corresponds to a feature or characteristic defined by the component 46, or a corresponding marking on the template 90, the substrate 12 and/or the magnetic base 14. In one example, the position indicators 20 are spaced at uniform intervals along the length of the flexible member 10, for example, at each inch or centimeter along the length of the flexible member 10, to provide a ruler or scale which can be used as a reference in positioning the flexible member 10 on the component 46 and/or relative to the template 90, the substrate 12, and/or the magnetic base 14.

Figure 10:
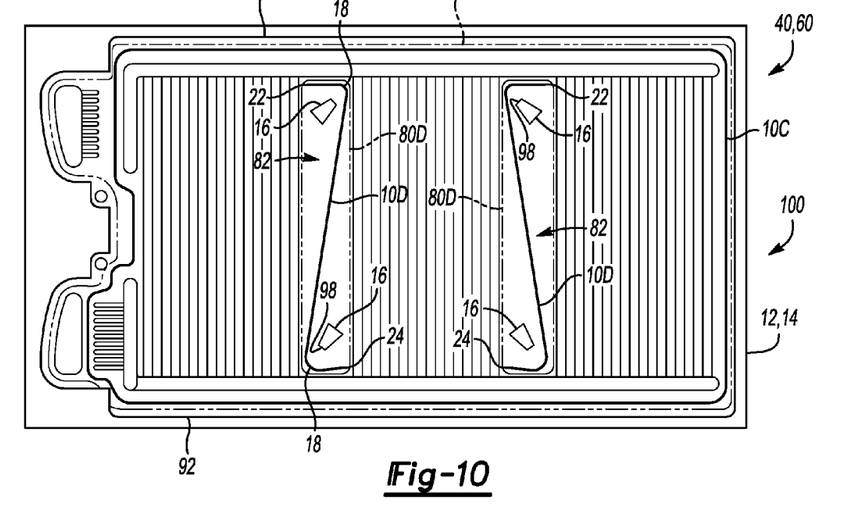
FIG. 10 is a schematic illustration of a top view of the cooling fin of FIG. 7 and a plurality of flexible members configured to retain the cooling plates forming the cooling fin to the electromagnetic base of the welding fixture of FIG. 3.

The flexible member 10 can be configured as a continuous flexible member as shown by the example of flexible member 10B in FIG. 1, where the flexible member 10B is configurable to define a closed shape, such as a polygon, oval, ellipsoid, etc. In the example shown in FIG. 1, the continuous flexible member 10B is shaped to conform to a weld path 80B which is defined by an interior perimeter edge 94 of the assembly 40, where the interior perimeter edge 94 defines an aperture or opening 88 in the assembly 40. Other configurations of the flexible member 10 are possible. Referring to FIG. 10, a flexible member 10C is configured and/or shaped to conform to an irregular shape defined by an exterior perimeter edge 92 of a frame portion 74 of cooling plate components 44, 46 to be welded to form an assembly 40, where the assembly 40 is configured as a cooling fin or radiator fin 60. The flexible member 10C shown in FIG. 10 may be molded and/or otherwise formed such that the flexible member 10C substantially retains the irregular shape shown in FIG. 10 conforming to the irregular perimeter 92 of a cooling fin assembly 60, such that subsequent to removal from the cooling fin 60 after welding of the cooling fin is completed, placement and positioning of the flexible member 10C on another set of components 44, 46 to be subsequently welded.

The weld template 90 can include one or more troughs 32 corresponding to one or more weld paths 80, where, for example, the components 44, 46 are positioned relative to the template 90 such that the weld path 80 is generally aligned in and/or overlaps the trough 32, such that the trough 32 provides clearance for forming of the weld 48 in the weld path 80 without the weld 48 contacting and/or adhering to the substrate 12 or the magnetic base 14. In the example shown in FIG. 4, the weld 48 is formed by a welding device 42 configured as one of a laser welding device configured to emit a laser beam, a plasma welding device configured to emit a plasma beam, and an electron beam welding device configured to emit an electron beam, such that the welding device 42 emits an energy beam (not shown) to heat the components 44, 46 along the weld path 80 to form the weld 48. As shown in FIG. 4, the trough 32 is defined by a recessed surface 38, which is recessed relative to the surface of the template 90 adjacent the trough 32, to provide clearance for formation of the weld 48. In one example, the recessed surface 38 can be shaped such that any portion of the energy of the beam which is not consumed in forming the weld 48 can be trapped and/or reflected within the trough 32, and converted into heat energy dissipated by the substrate 12 and/or the magnetic base 14. In the example shown, the recessed surface is contoured, e.g., is non-planar and/or curved, to provide a surface for trapping and/or reflecting the energy beam emitted by the welding device 42. The welding device 42 is configured for continuous movement relative to the weld path 80, such that the energy beam emitted by the welding device 42 can be directed or steered continuously along the weld path 80 without stopping and starting. For example, the welding device 42 may be include one or more motors, such as servo motors, for multi-directional movement of the welding device 42 along the weld path 80, where movement of the welding device 42 may be controlled by a controller (not shown).

The weld template 90 can be formed in the magnetic base 14, wherein in this configuration the components 44, 46 to be welded can be received directly onto the magnetic base 14, such that component 46 in the illustrative example is retained by the retention force 58 in direct contact with the magnetic base 14. In another embodiment shown in FIGS. 1-4, the weld template 90 can formed in a substrate 12 which can be positioned on the magnetic base 14 such that the components 44, 46 to be welded can be received directly on to the substrate 12, and such that component 46 in the illustrative example is retained by the retention force 58 in direct contact with the substrate 12. In the example shown in FIGS. 1-4, the surface of the substrate 12 including the weld template 90 is bound by a substrate perimeter edge 84, and the surface of the magnetic base 14 upon which the substrate 12 is positioned is bound by a base perimeter edge 86. In the example shown, the substrate 12 has a smaller surface area than the surface area of the magnetic base 14, e.g., the substrate perimeter edge 84 is contained within the base perimeter edge 86. This example is non-limiting, such that the substrate 12 may be configured to have the same surface area and shape as the magnetic base 14 such that the substrate and base perimeters 84, 86 are coincident, or the substrate 12 may extend beyond the base perimeter 86, for example, to receive a component 44, 46 which is larger in area than the surface of the magnetic base 14.

In one example, the substrate 12 is formed of a magnetic material, such as a non-magnetic material, such that the substrate 12 is retained in position relative to the magnetic base 14 by magnetic attraction between of the substrate 12 and the magnetic base 14, when the magnetic base 14 is selectively activated to produce a magnetic field. In another example, the substrate 12 is formed of a non-magnetic material including a magnetic filler material and/or including one or more magnetic inserts, such that the substrate 12 is retained in position relative to the magnetic base 14 by magnetic attraction between of the magnetic filler material and/or the magnetic inserts and the magnetic base 14, when the magnetic base 14 is selectively activated to produce a magnetic field. In another example, the substrate 12 can be formed of a non-magnetic material and retained to the magnetic base 14 by any suitable means including, for example, clips, dowels, etc., and/or by the retention force 58 generated between the flexible member 10 and the magnetic base 14 when the magnetic base 14 is in an activated condition, e.g., when the magnetic base 14 is activated to produce a magnetic field.

In the example shown in FIGS. 1-4, the pattern and shape of the troughs 32A and 32B is determined respectively by the weld paths 80A, 80B, which are defined by the welds 48 required to join the components 44, 46 to form the assembly 40. As such, the example template 90 shown in FIGS. 1-4 is specific to the particular configuration of the example assembly 40 shown in FIGS. 1-4. As such, it would be understood that the system 100 can include more than one substrate 12, where the template 90 formed in each substrate 12 is defined by a specific assembly 40 assigned to that substrate 12. For example, a first substrate 12 can include a first template 90 which is defined by a first assembly 40 and can include one or more troughs 32 determined by one or more weld paths 80 of welds 48 joining the first assembly 40. A second substrate 12 can include a second template 90 which is defined by a second assembly 40 and can include one or more troughs 32 determined by one or more weld paths 80 of welds 48 joining the second assembly 40, where the weld paths 80 of the second assembly 40 are different in shape or configuration than the weld paths 80 of the first assembly 40, and so on. The use of multiple substrates 12, where each substrate 12 is assigned to and defined by a corresponding assembly 40, provides a number of advantages to the welding system 100, including, for example, reduction in the cost and set-up time of the welding system 100, as it would be understood that providing a substrate 12 including a specific template 90 for each type of assembly 40 to be welded would be less expensive than providing a magnetic base 14 including a specific template 90 for each type of assembly 40 to be welded. Further, changeover of the welding process from welding a first assembly 40 to welding a second assembly 40 would require only removing the first substrate 12 from the magnetic base 14 and replacing it with the second substrate 12, thereby providing for a quick changeover between welding of different assemblies 40. The examples described herein are illustrative and non-limiting, and other configurations and/or combinations of substrates 12 and magnetic bases 14 could be used to provide the weld template 90 for receiving the components 44, 46 to be welded. For example, the substrate 12 may include a first weld template 90 formed on a first side of the substrate 12 and a second weld template 90 formed on the opposing second side of the substrate 12 such that the welding process could be changed over from welding the first assembly 40 to welding the second assembly 40 by flipping over the substrate 12 to the second side. For example, the substrate 12 may include a first weld template 90 specific to a first assembly 40 and a second weld template 90 specific to a second assembly 40, both formed in the substrate 12, such that the substrate 12 can be used for welding either the first or second assembly 40, with no changeover of the substrate 12 required. In this example, the substrate 12 may be configured to differentiate the first template 90 from the second template 90, for example, by a visual differentiator such as color coding, visual markings, or the like.

Referring again to FIGS. 1-4, the welding system 100 can include one or more magnetic locating elements 16 which can be positioned on the template 90, e.g., on the substrate 12 or the magnetic base 14, and/or on the components 44, 46 to be welded, as shown in FIGS. 1, 2, 4 and 10. The magnetic locating element 16 may be referred to herein as a locating element or as a locator. The locating element 16 includes a magnetic component 50, which may be referred to herein as a locator magnet 50. The locator magnet 50 and the magnetic component 28 of the flexible member 10 are configured such that when the locator magnet 50 is placed proximate the flexible member 10, a repulsive magnetic force 56 (FIG. 4) is generated between the locator magnet 50 and the flexible member 10, such that the flexible member 10 and the locator magnet 50 are displaced from each other, e.g., remain separated from each other, by a clearance spacing 96. As such, the locating element 16 and the clearance spacing 96 can be used to locate and/or control the positioning of the flexible member 10 relative to the components 44, 46 and the weld template 90. The repulsive magnetic force 56 generated between the locating element 16 and the flexible member 10 may also be referred to herein as the magnetic locating force 56 or as the locating force 56. The magnitude of the clearance spacing 96 is determined by the strength of the repulsive magnetic force 56 generated between the flexible member 10 and the locating element 16, such that the clearance spacing 96 can be changed by changing one of the magnetic strength of the magnetic component 28 in the flexible member 10 and the magnetic strength of the locator magnet 50 in the locating element 16 so as to change the magnitude of the repulsive magnetic force 56 generated between the flexible member 10 and the locating element 16. As shown in detail in FIG. 4, the clearance spacing 96 provide clearance for a welding device 42, for example, a scanning laser welder, to access a weld path 80 adjacent a perimeter edge 92, where the perimeter edge 92 and the weld path 80 are positioned intermediate the flexible member 10 and the locating element 16. In one example, the clearance spacing is in the range of 3 to 6 mm.

In the non-limiting example shown in FIGS. 1 and 4, the locating element 16 is generally trapezoidal in shape and the locator magnet 50 is positioned at a locator face 98 defining the narrowest side, e.g., the narrow end, of the trapezoidal shape of the locating element 16, such that the locator magnet 50 can be positioned immediately adjacent the flexible member 10 during set-up of the weld fixture 100 by orienting the narrow end of the locating element 16 defined by the locator face 98 toward the flexible member 10. Other configurations of the locating element 16 could be used, for example, the locator magnet 50 could be located centrally within the locating element 16 such that the locator magnet 50 in each locating element 16 is co-axial with the locating element 16. In one example, the locating element 16 may be molded from a polymer material with the locator magnet 50 inserted into the molded locating element 16, such that the polymer material prevents damage, such as marring or scratching, of the assembly 40 during processing, for example, due to incidental contact with the locating elements 16 during loading and unloading of the components 44, 46 and assembly 40 from the welding fixture 100. The polymer material may be a thermoplastic material or a thermoset material resistant to heat distortion or other deterioration due to heat generated during the welding operation forming the weld 48. The locating element 16 can include a magnetic attachment 54, for example, adjacent an interface surface 52 for retaining the locating element 16 to the template 90, where the magnetic attachment 54 may be magnetically attracted to a magnetic material forming one of the substrate 12 and/or magnetic base 14, or may be magnetically attracted to the magnetic base 14 when the magnetic base 14 is activated to produce a magnetic field.

Figure 3:
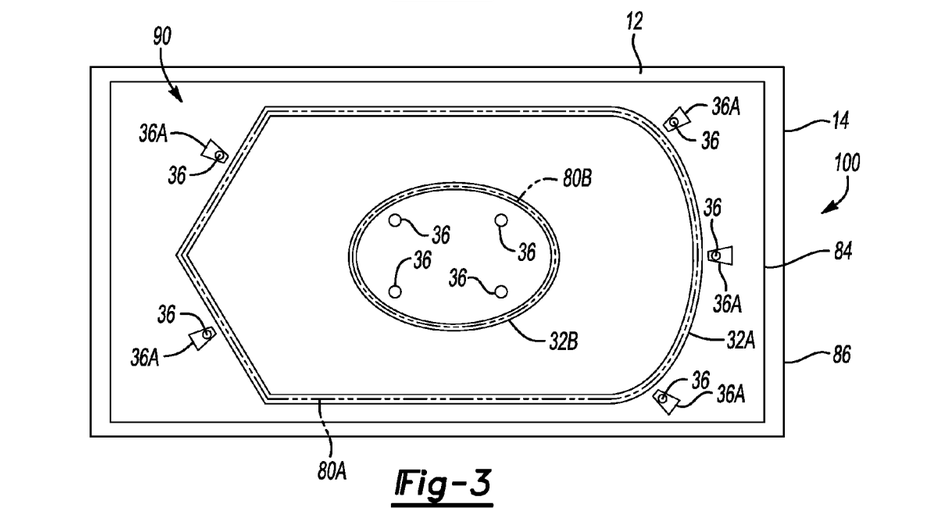
FIG. 3 is a schematic illustration of a top view of the welding fixture of FIG. 1 showing a substrate including a welding template.

As shown in FIG. 3, the weld template 90 can include a template interface 36, 36A for positioning and orientation of the locator magnet 50. Referring to FIGS. 1, 3 and 4, the locating element 16 can include one or more locator interfaces 34, 34A for positioning and orienting the locating element 16 relative to the weld template 90. By way of non-limiting example, the locating element 16 can include a locator interface 34 configured as an extension 34 which can be received into a template interface 36 which is configured as a recess 36, where the extension 34 and recess 36 are corresponding in shape to position the locating element 16 in the weld template 90 and substrate 12. In the illustrative example, the extension 34 is configured as a round dowel post and the recess 36 is configured as a round dowel hole. The example is non-limiting, and other configurations of the extension 34 and recess 36, such as a non-square rectangular tab and slot, could be used, where the corresponding shapes of the extension 34 and recess 36 define the orientation of the locating element 16 relative to the welding template 90. In another example, the template 90 can include a template interface 36A to provide a visual indication of the placement and orientation of the locating element 16, using a locator interface 34A which corresponds to the template interface 36A. In the example shown, the template interface 36A is an outline marked on the weld template 90, for example, by scribing or engraving the outline 36A on to the substrate 12 surface, or by otherwise marking the outline 36A using paint, ink, labeling, etc., where the outline 36A, in the illustrative example, is trapezoidal in shape corresponding to the trapezoidal shape of the interface surface 52 of the locating element 16, such that the locating element 16 can be positioned and oriented to welding template 90 by alignment of the locator interface 34A, defined by the perimeter of the interface surface 52, with the outline 36A.

Still referring to FIGS. 1, 2, 4 and 10, in a non-limiting example each of the locating elements 16 each can include a locator magnet 50 of substantially the same magnetic strength, such that the repulsive magnetic force 56 generated between each of the locating elements 16 and the flexible member 10 is constant, and such that the resulting clearance spacing 96 between each of the locating elements 16 and the flexible member 10 is constant. In another example, the welding system 100 can include more than one set of locating elements 16, where each locating element 16 of a first set of locating elements 16 includes a first locator magnet 50 having a first magnetic strength configured to provide a first clearance spacing 96, each locating element 16 of a second set of locating elements 16 includes a second locator magnet 50 configured to provide a second clearance spacing 96 different from the first clearance spacing 96, and so on, such that a selection of first, second and so on, locating elements 16 may be used to vary the clearance spacing 96 between the respective locating element 16 and the flexible member 10 at various locations on the components 44, 46, for example, where required to provide sufficient clearance for movement and manipulation of the welding device 42 to access the weld path 80 when forming the weld 48. In one example, the each set of locating elements 16 may be visually differentiated from each other set of locating elements 16, for example, by color coding, labeling, marking, shape, size, or the like, such that the magnetic strength of the locator magnet 50 and corresponding locating force 56 and clearance spacing 96 can be visually identified for each locating element 16 using the visual differentiator, to aid in set-up and changeover of the welding system 100 and/or to reduce set-up and changeover time. In this example, the template interface 36 of the template 90 may be configured and/or visually identified to correspond to visual differentiators indicating the magnetic strength of the locator magnet 50, to aid in set-up and changeover.

The locating elements 16 can be positioned on the substrate 12, on the magnetic base 14 and/or on the components 44, 46 to be welded, as required to locate and/or position a flexible member 10. Referring to FIGS. 1-4, a first group of locating elements 16 are positioned on the substrate 12 outboard of a first weld trough 32A, e.g., between the first weld trough 32A and the substrate perimeter 84, to exert a locating force 56 on a first flexible member 10A to maintain a clearance spacing 96 between the flexible member 10A and the locating element 16, as shown in detail in FIG. 4. As shown in FIGS. 1, 2 and 4, the flexible member 10A is positioned on the components 44, 46 to be welded, immediately adjacent and conforming to a first weld path 80A which is immediately adjacent to the exterior perimeter edge 92 of the components 44, 46, such that, when the magnetic base 14 is activated to produce a magnetic field, a retention force 58 is exerted on the components 44, 46 by the flexible member 10A in cooperation with the activated magnetic base 14, to retain the components 44, 46 in position on the substrate 12 and to substantially close any gap 70 (FIG. 8) between the components 44, 46 at the weld path 80A adjacent the flexible member 10A. As shown in detail in FIG. 4, the components 44, 46 are positioned on the substrate 12 relative to the template 90 such that the exterior perimeter edge 92 and weld path 80 are intermediate the locating element 16 and the flexible member 10A and extend over the trough 32A. The clearance spacing 96 is maintained between each of the locating elements 16 surrounding the exterior perimeter edge 92 of the components 44, 46, such that the welding device 42 can access the weld path 80A and continuously move along the weld path 80A to form a continuous weld 48 along the weld path 80A.

Referring to FIGS. 1-3, a second group of locating elements 16 are positioned on the substrate 12 inboard of a second weld trough 32B, e.g., within an aperture 88 formed in the components 44, 46 and defined by an interior perimeter edge 94 of the components 44, 46, to exert a locating force 56 on a second flexible member 10B to maintain a clearance spacing 96 between the flexible member 10B and the locating element 16, as previously described related to FIG. 4. As shown in FIGS. 1 and 2, the flexible member 10B is positioned on the components 44, 46 to be welded, immediately adjacent and conforming to a second weld path 80B which is immediately adjacent to the interior perimeter edge 94 of the components 44, 46, such that, when the magnetic base 14 is activated to produce a magnetic field, a retention force 58 is exerted on the components 44, 46 by the flexible member 10B in cooperation with the activated magnetic base 14, to retain the components 44, 46 in position on the substrate 12 and to substantially close any gap 70 (FIG. 8) between the components 44, 46 at the weld path 80B adjacent the flexible member 10B. As shown in FIG. 1, the components 44, 46 are positioned on the substrate 12 relative to the template 90 such that the interior perimeter edge 94 and weld path 80B are intermediate the locating element 16 and the flexible member 10B and extend over the trough 32B. The clearance spacing 96 is maintained between each of the locating elements 16 surrounding the interior perimeter edge 94 of the components 44, 46, such that the welding device 42 can access the weld path 80B and continuously move along the weld path 80B to form a continuous weld 48 along the weld path 80B.

Referring now to FIG. 10, a third group of locating elements 16 are positioned on the components 44, 46, within a central portion 66 of the assembly 40 formed by welding of the components 44, 46. In an illustrative example shown in FIGS. 7-10, the assembly 40 can be a cooling assembly 60 such as a cooling fin for a radiator or a battery cooling plate. In this example, the locating member 16 is operable to concurrently exert a locating (repulsive magnetic) force 56 on the flexible member 10D, using a locator magnet 50 included in the locating element 16, as previously described, and exert a retention (attractive magnetic) force 58 on the components 44, 46 using the magnetic attachment 54. The Z-shaped flexible member 10D and the locating elements 16 are located such that clearance is maintained along the continuous length of a weld path 80D (FIG. 10), such that the welding device 42 can access the weld path 80D and continuously move along the weld path 80D to form a continuous weld 48 (FIG. 8) providing a hermetic seal along the weld path 80D.

In the example shown, the cooling assembly 60 is formed by welding at least two components 44, 46 together, where each of the components 44, 46 is configured as a cooling component, also referred to herein as a cooling plate 44, 46. The cooling plates 44, 46 are welded together along weld paths 80C, 80D to form a hermetic seal along each of the weld paths 80C, 80D such that a cooling fluid can be circulated in and through primary and secondary passages 62, 64 of the cooling assembly 60 during operation of the cooling assembly 60, where the primary and secondary passages 62, 64 are sealed by the hermetic seal provided by the welds 48 formed along the weld paths 80C, 80D. The cooling fluid can be one of a gas or a liquid fluid. The cooling fluid enters the passages 62, 64 of the cooling assembly 60 via an inlet 76, and after circulation through the primary and/or secondary passages 62, 64 to cool the cooling plates 44, 46, exits the cooling assembly 60 via an outlet 78. In the illustrative example, the cooling plates 44, 46 can be made of one of an aluminum based material and a stainless steel material. The cooling plates 44, 46 can each have a thickness in the range of 0.05 mm to 0.3 mm. In one example, the cooling plates 44, 46 are made of an aluminum based sheet material having a thickness at or about 0.2 mm. In another example, the cooling plates 44, 46 are made of a stainless steel material having a thickness at or about 0.1 mm. The cooling assembly 40, 60 can include more than two components 44, 46 such that multiple cooling sheets 44, 46 can be layered and joined by welds 48 to provide a multi-layer cooling assembly 60.

The cooling assembly 60 includes a frame portion 74 surrounding the primary cooling passage 62, such that the frame portion 74 is intermediate the primary cooling passage 62 and an exterior perimeter edge 92 of the cooling assembly 60. A continuous weld path 80C is defined by the frame portion 74 immediately adjacent the exterior perimeter edge 92, and intermediate the exterior perimeter edge 92 and the primary cooling passage 62, as shown in FIG. 10. In the example shown, a flexible member 10C configured to substantially conform to the weld path 80C is positioned in the frame portion 74 intermediate the primary cooling passage 62 and the weld path 80C, such that when the magnetic base 14 is energized, an attractive magnetic force 58 is generated between the magnetic base 14 and the flexible member 10C, which acts as a retaining force 58 such that the cooling plates 44, 46 are retained in position relative to the magnetic base 14 by the flexible member 10C. During welding, the welding device 42 can access the weld path 80C, in an illustrative example, from a position outboard of the exterior perimeter edge 92, and continuously move along the exterior perimeter edge 92 and along the weld path 80C to form a continuous weld 48 (FIG. 8) providing a hermetic seal along the weld path 80C to seal the primary passage 62. By way of non-limiting example, the welding device 42 can be initially positioned off board from the components 44, 46, such that the welding device 42 can be actuated and accelerated from a stopped position to a constant velocity prior to being moved in position to initiate welding along the weld path 80C. As such, variability in the weld 84 caused by changes in the velocity of the welding device 42 and/or due to starting or stopping of the welding device 42 is negligible and/or substantially eliminated, and/or occurs outside of the weld path 80C, for example, at the exterior perimeter edge 92 and prior to transitioning the welding beam onto the weld path 80C. Similarly, after the welding device has been continuously moved at a constant velocity along the weld path 80C to form a continuous weld 48 and hermetic seal along the weld path 80C, the welding device 42 can be moved off the weld path 80C while still moving at a constant velocity, such that the welding beam can be stopped off board the cooling assembly 60, and such that variability in the weld 48 due to changes in the velocity of the welding device 42 at the end of the welding cycle is minimized and/or eliminated. Because the weld 48 is initiated and terminated at points outside the weld path 80C, the weld 48 is continuous, e.g., is without start and stop points, such that any variability which could have resulted from starting and/or stopping weld formation along the weld path 80C is avoided. The example is illustrative, and it would be understood that the method of initiating and terminating formation of a weld 48 at points outside of the weld path 80 is not limited to the example shown in FIGS. 7-10, and can be used to form a continuous weld 48 along a weld path 80 such that during formation of the weld 48 along the weld path 80 the weld device 42 is emitting a welding beam when entering and exiting the welding path 80 and is moving at a constant velocity when entering and exiting the welding path 80 and as moved along the welding path 80, such that variation in the weld 48 attributable to variability in the welding beam and the velocity of the welding device 42 is negligible and/or substantially eliminated, and the resulting weld 48 is characterized by consistent properties, including consistent size and shape and by an absence of porosity or other discontinuities which may be attributable to starting or stopping weld formation in the weld path 80 or varying the rate at which the component material is heated during welding to form the weld 48.

Figure 9:
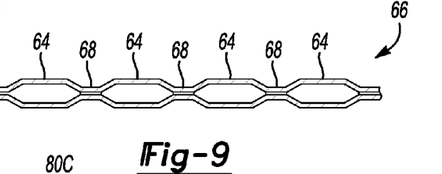
FIG. 9 is a schematic illustration of a cross-sectional fragmentary view of section 9-9 of FIG. 7.

Referring again to FIGS. 7-10, in the example shown, the cooling plates 44, 46 which when layered together and joined by welding as shown in FIGS. 7-10 form the cooling assembly 60 including a central portion 66 which is substantially surrounded by the primary passage 62. The central portion 66 includes a plurality of secondary passages 64 FIGS. 7 and 8), which may be divided into multiple segments or groups, each group including a plurality of secondary passages 64 and separated from another group by a bridge portion 82. Adjacent secondary passages 64 are separated from each other by a rib 68 formed by layering the components 44, 46 in contact with each other as shown in FIG. 9. The components 44, 46 are joined together by a continuous weld 48 (FIG. 8) formed along the weld path 80C, as previously described, and are further joined together, in the example, by a continuous weld 48 (FIG. 8) formed along weld paths 80D formed about the perimeter of the bridge portion 82. In use, a cooling fluid, which may be a gas or liquid, is circulated through the primary and secondary passages 62, 64 to effect heat transfer via the cooling assembly 60. In one example, a weld 48 can be formed along one or more of the ribs 68 to further direct the fluid flow through the cooling assembly 60.

As shown in FIG. 10, flexible members 10D are positioned on each of the bridge portions 82 of components 44, 46 within the central portion 66, with ends 22, 24 of the flexible member 10D located in first and second opposing corners of the bridge portion 82 immediately adjacent the perimeter of the bridge portion 82 and the weld path 80D. The flexible member 10D includes hinges 18 located along the length of the flexible member 10D such that the flexible member 10D is configurable into the Z-shape shown in FIG. 10, with a hinge 18 of the flexible member 10D immediately adjacent to the weld path 80D at third and fourth opposing corners of the bridge portion 82, to distribute the retention force 58 exerted by the flexible member 10D to all four corners of the bridge portion 82. Locating elements 16 are used to exert a locating force 56, e.g., a repulsive magnetic force, at hinges 18, in the illustrative example, to retain the hinged portion at the corner. The locating members 16 shown in FIG. 10 can include, as previously described herein, a magnetic attachment 54 (FIG. 4) for retaining the locating element 16 to the components 44, 46, where the magnetic attachment 54 may be magnetically attracted to the magnetic base 14 when the magnetic base 14 is activated to produce a magnetic field, such that the magnetic attachment 54 cooperates with the magnetic base 14 to exert a retention force 58 on the components 44, 46 and to retain the locating components 16 in position relative to the bridge portions 82 and the flexible member 10D during welding along the weld paths 80D.

As previously described herein, the flexible member 10C is molded or otherwise formed such that the flexible member 10C retains the shape shown in FIG. 10, which is defined by the frame portion 74 of the cooling assembly 60, and is therefore readily positioned on the frame portion 74 to substantially conform to a weld path 80C defined along the exterior perimeter edge 92 of the components 44, 46. In this example, because the flexible member 10C is preformed into the shape shown, the use of locating elements 16 to locate the flexible member 10C may not be required, and/or may be optional. Because no locating elements 16 are required outboard of the components 44, 46, the space required between the exterior perimeter edge 92 of the components 44,46 and the base perimeter edge 86 (FIG. 1) can be minimal, such that a relatively smaller magnetic base 14 and/or substrate 12 can be used, with clearance maintained along the continuous length of the weld path 80C, such that the welding device 42 can access the weld path 80C and continuously move around the exterior perimeter edge 92 and along the weld path 80C to form a continuous weld 48 (FIG. 8) providing a hermetic seal along the weld path 80C.

A method of welding the components 44, 46 to form an assembly 40, using the welding system 100, is provided herein. The method includes receiving the components 44, 46 onto one of the magnetic base 14 or a substrate 12 positioned on the magnetic base 14. The method can further include positioning the components 44, 46 relative to a weld template 90, where the weld template 90 can be included in the one of the magnetic base 14 and/or substrate 12 receiving the components 44, 46, and where the weld template 90 corresponds to and/or is defined by one or more weld paths 80 of the assembly 40. The method further includes positioning at least one flexible member 10, where the flexible member 10 includes a magnetic component 28 as previously described herein, onto components 44, 46, such that when the magnetic base 14 is activated to produce a magnetic field, an attractive force 58 is generated between the flexible member 10 and the magnetic base 14, where the attractive force 58 operates as a retaining force 58 exerted by the flexible member 10 on the components 44, 46 to retain the components 44, 46 to the magnetic base 14 in a position relative to the weld template 90.

The flexible member 10 can be configured to conform to and/or be positioned immediately adjacent to a weld path 80 defined by the components 44, 46, such that the retaining force 58 exerted on the components 44, 46 substantially closes a gap 70 between the components 44, 46 at the weld path 80. The weld path 80 may be immediately adjacent to a perimeter edge of the components 44, 46, which may be one of an exterior or interior perimeter edge 92, 94. The weld path 80 may be defined within a central portion 66 of the components 44, 46 (FIG. 10). The weld path 80 may be continuous, e.g., such that a weld 48 formed on the weld path 80 is formed as a continuous weld 48, e.g., is uninterrupted by starting or stopping of the welding device 42 along the weld path 80.

In one example, the weld template 90 can include a trough 32 defined by and corresponding to the weld path 80, and positioning the components 44, 46 relative to the magnetic base 14 and the weld template 90 can include positioning the components 44, 46 such that the weld path overlaps and/or extends into the trough 32. The method can further include positioning one or more locating members 16 on at least one of the weld templates 90, the components 44, 46, the substrate 12 and/or the magnetic base 14. The locating member 16 can be positioned relative to a flexible member 10 such that a locator magnet 50 of the locating member 16 cooperates with the magnetic component 28 of the flexible member 10 to generate a repulsive force 56 therebetween, where the repulsive force 56 locates the flexible member 10 relative to the locating member 16 and relative to a weld path 80 defined by the components 44, 46 and intermediate the locating member 16 and the flexible member 10 to provide a clearance spacing 96 for a welding device 42 to access the weld path 80, to form a weld 48 along the weld path 80. The flexible members 10 and locating members 16 are positioned such that an uninterrupted and continuous clearance spacing 96 is provided along the entire length of the weld path 80, such that the welding device 42 can be moved continuously along the weld path 80 without interruption and/or without being diverted from the weld path 80 during formation of the continuous weld 48.

The method further includes actuating the welding device 42 to emit a welding beam configured to form a weld 48 joining the components 44, 46. The method can include initiating actuation of the welding device 42 at a starting point which is not defined by the weld path 80, e.g., is outside of the weld path 80, and moving the welding device 42 from the starting point to the weld path 80 in a manner such that, when the welding beam contacts the weld path 80 to form the weld 48, the welding beam is being emitted at a constant energy level and the welding device 42 is being moved along the weld path 80 at a constant welding speed. As such, the weld 48 formed along the weld path 80 is devoid of any variation in weld formation due to variability in the energy level of the welding beam at initial actuation of the welding device 42, and/or any variability in the speed at which the welding device 42 is moved, for example, when accelerating from a stop to a constant welding speed. The method can further include, after completing formation of the weld 48 along the weld path 80, diverting, e.g., moving the welding device 42 from the weld path 80 prior to changing the speed at which the welding device 42 is being moved and/or prior to changing the energy level of the welding beam, such that the welding device 42 is decelerated and/or de-actuated at a point which is located off the weld path 80. In one example, the starting and stopping points can be located off the components 44, 46, e.g., outboard of an exterior perimeter edge 92 or inboard of an interior perimeter edge 94.

Using the method and welding apparatus 100 described herein, the welding device 42 can form a continuous weld 48 along the weld path 80 without having to interrupt formation of the weld 48 to remove, replace and/or relocate the flexible members 10 and/or locating elements 16 used as described herein to retain the components 44, 46 in position relative to each other and the weld template 90 during the welding process. The retention force 58 provided by the flexible magnetic member 10 is uniform across and adjacent to the area of the components 44, 46 contacted by the flexible member 10, such that distortion, waviness, etc. of the components 44, 46 due to application of the retention force 58 is negligible or eliminated and the gap 70 between the components along the weld path 80 to be welded is minimized or eliminated, such that the gap width 72 is negligible and/or approaches zero. Because the weld path 80 is uninterrupted by fixturing, a welding device 42 can access and traverse the the weld path 80 in a continuous, consistent, and uninterrupted manner to form a continuous and uniform weld 48 along the weld path 80, enhancing the consistency and quality of the weld 48 and eliminating weld discontinuities attributable to starting and stopping weld formation, variability in the speed of the welding device as it travels along the path 80, variability in the strength of the weld beam at stopping and starting of the beam, etc. Because the retention force 58 exerted by the flexible member 10 is distributed consistently and continuously along the weld path 80, welding distortion is minimized during heating and cooling of the components 44, 46 when forming the weld 48. Welding cycle time and cost is decreased by forming a single continuous weld 48 along the weld path 80, and by not having to remove and/or reposition fixturing, such as pneumatic clamps, to provide clearance for a welding device 42 to access the entirety of the weld path and by not having to interrupt weld formation, e.g., by not having to start and stop the welding device 42 along the weld path 80 for relocation of clamps.

The examples provided herein are illustrative. The method and apparatus described herein can also be used, for example, to plastic weld multiple sheets made of polymer based material together. The welding system 100 can further include means for automatically and/or robotically placing and positioning one or more of the components 44, 46, the flexible members 10, and/or the locating components 16 on the magnetic base 14, where control systems including vision systems and positioning systems can also be included to control placement and positioning of the components 44, 46, flexible members 10, and/or locating components 16 on and relative to the magnetic base. A controller (not shown) can be provided and configured to coordinate and control the loading, welding, and/or unloading of components 44, 46.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A welding fixture for joining at least two components by welding, the welding fixture comprising:
   a magnetic base, wherein the magnetic base is configured to produce a magnetic field when activated;
   wherein the magnetic base is configured to receive at least two components to be welded along a weld path defined by the at least two components;
   a flexible member including a casing and a magnetic component;
   wherein the magnetic component is contained by the casing;
   wherein the magnetic component is made of at least one of a magnetic material and a ferromagnetic material;
   wherein the casing is flexibly reconfigurable from a first shape to at least a second shape;
   wherein during welding, the at least two components are layered in contact with each other and positioned between the flexible member and the magnetic base such that:
      a first one of the at least two components is in contact with the flexible member;
      a second one of the at least two components is in contact with the magnetic base; and
      the second one of the at least two components is layered between the first one of the at least two components and the magnetic base;
   wherein activation of the magnetic base generates a magnetic retention force between the magnetic component and the magnetic base such that the at least two components layered in contact with each other are retained to the magnetic base by the magnetic retention force; and
   wherein during welding, the flexible member is positioned relative to the weld path with the casing configured in one of the first shape and at least the second shape such that a continuous clearance spacing is defined between the flexible member and the weld path.

2. The welding fixture of claim 1, wherein the flexible member configured in the one of the first shape and at least the second shape is positioned immediately adjacent to the weld path such that the shape of the flexible member substantially conforms to the shape of the weld path.

3. The welding fixture of claim 1, wherein the flexible member includes a first end and a second end; and
   wherein each of the first and second ends is in contact with the one of the at least two components.

4. The welding fixture of claim 3, further comprising a connector configured to connect the first and second ends to provide a continuous flexible member.

5. The welding fixture of claim 1, wherein the flexible member is a continuous flexible member.

6. The welding fixture of claim 1, wherein the flexible member includes at least one joint.

7. The welding fixture of claim 1, wherein the flexible member casing is made of a polymer based material.

8. The welding fixture of claim 7, wherein the magnetic component comprises a plurality of magnetic components distributed in the polymer based material.

9. The welding fixture of claim 1, further comprising:
a locating element including a locator magnet configured to generate a repulsive force between the locator magnet and the magnetic component;
wherein the locating element is positioned on the magnetic base proximate the flexible member; and
wherein a magnitude of the continuous clearance spacing is defined by a strength of the repulsive magnetic force between the flexible member and the locating element.

10. The welding fixture of claim 9, wherein the magnetic base further comprises:
a welding template including a template interface to receive the locating element.

11. The welding fixture of claim 1, further comprising:
a substrate configured to receive the at least two components;
wherein a second one of the at least two components is in contact with the substrate such that the substrate is positioned intermediate the at least two components and the magnetic base.

12. The welding fixture of claim 11, wherein the substrate is made of a magnetic material.

13. The welding fixture of claim 11, wherein the substrate includes a weld template defined by the weld path.

14. The welding fixture of claim 13, wherein the weld template includes a weld trough corresponding to the weld path.

15. The welding fixture of claim 13, further comprising:
a locating element including a locator magnet;
wherein the weld template includes a template interface configured to receive the locating element.

16. The welding fixture of claim 15, wherein the locating element is configured to cooperate with the flexible member to generate a repulsive magnetic force between the flexible member and the locating element.

17. The welding fixture of claim 16, wherein the weld path and the continuous clearance spacing is intermediate the flexible member and the locating element.

18. A method for joining at least two components by welding, using a welding fixture, the method comprising:
receiving at least two components on to a magnetic base;
wherein the at least two components comprise a first component and a second component;
wherein the magnetic base is configured to produce a magnetic field when activated;
wherein the at least two components define a weld path for welding the at least two components;
providing a flexible member including a casing and a magnetic component wherein the magnetic component is contained by the casing;
wherein the magnetic component is made of at least one of a magnetic material and a ferromagnetic material;
wherein the casing is flexibly reconfigurable from a first shape to at least a second shape;
positioning the at least two components on the magnetic base such that:
the at least two components are layered in contact with each other;
the second one of the at least two components is in contact with the magnetic base; and
the second one of the at least two components is layered between the first one of the at least two components and the magnetic base;
positioning the flexible member in contact with the first one of the at least two components such that:
the at least two components are layered between the flexible member and the magnetic base; and
the flexible member is positioned relative to the weld path with the casing configured in one of the first shape and at least the second shape such that a continuous clearance spacing is defined between the flexible member and the weld path;
activating the magnetic base
to generate a magnetic retention force between the magnetic component and the magnetic base;
retaining, using the magnetic retention force, the at least two components layered in contact with each other, to the magnetic base.

19. The method of claim 18, further comprising:
positioning a locating element proximate to the flexible member;
wherein the locating element includes a locator magnet configured to generate a repulsive magnetic force between the magnetic component of the flexible member and the locating element; and
wherein a magnitude of the continuous clearance spacing is is defined by a strength of the repulsive magnetic force between the flexible member and the locating element.

20. The method of claim 18, further comprising:
actuating a welding device;
continuously moving the actuated welding device along the welding path to form a continuous weld along the welding path;
wherein the continuous weld is formed between the at least two components layered in contact with each other.

* * * * *